United States Patent
Roffman et al.

[11] Patent Number: 5,512,220
[45] Date of Patent: Apr. 30, 1996

[54] METHOD OF MAKING A CLEAR AXIS, SEGMENTED MULTIFOCAL OPHTHALMIC LENS

[75] Inventors: Jeffrey Roffman; Robert LaBelle; Edgar Menezes; Carl Crowe, all of Jacksonville, Fla.

[73] Assignee: Johnson & Johnson Vision Products, Inc., Jacksonville, Fla.

[21] Appl. No.: 62,918

[22] Filed: May 14, 1993

Related U.S. Application Data

[60] Division of Ser. No. 827,199, Jan. 28, 1992, abandoned, which is a continuation-in-part of Ser. No. 728,903, Jul. 10, 1991, Pat. No. 5,198,844.

[51] Int. Cl.$^6$ .................................................. B29D 11/00
[52] U.S. Cl. .............................. 264/2.5; 264/1.8; 425/808
[58] Field of Search ................................ 264/1.7, 1.8, 2.2, 264/2.5; 425/808

[56] References Cited

U.S. PATENT DOCUMENTS

| | | | |
|---|---|---|---|
| 3,109,696 | 11/1963 | Whitney | 264/2.5 |
| 3,555,126 | 1/1971 | Gitson | 264/2.5 |
| 4,426,139 | 1/1984 | van Ligten et al. | |
| 4,605,524 | 8/1986 | Danker | 425/808 |
| 4,676,610 | 6/1987 | Barkan et al. | 264/2.5 |
| 4,923,296 | 5/1990 | Erickson | |
| 5,096,285 | 3/1992 | Silberman | |
| 5,219,497 | 6/1993 | Blum | 264/1.7 |

FOREIGN PATENT DOCUMENTS 295849 12/1988 European Pat. Off. ............... 425/808

*Primary Examiner*—Mathieu D. Vargot

[57] ABSTRACT

A method of making a multifocal refractive lens to focus light on the retina of the eye. The lens includes a plurality of segments, having different optical powers, at least one for distance vision and another for near. The lens does not require orientation to produce adequate far and near vision and normal stereoscopic effect. One or both of the segments having the optical powers may have aspherical lens surface. The central zone of the lens consists of only one lens segment, providing a clear central axis. Segments of the other optical power border the first segment along a path defined by a semi-circle or hyperbola that extends from one point along the periphery of the adjoining segments to another point along the periphery of the adjoining segments.

3 Claims, 7 Drawing Sheets

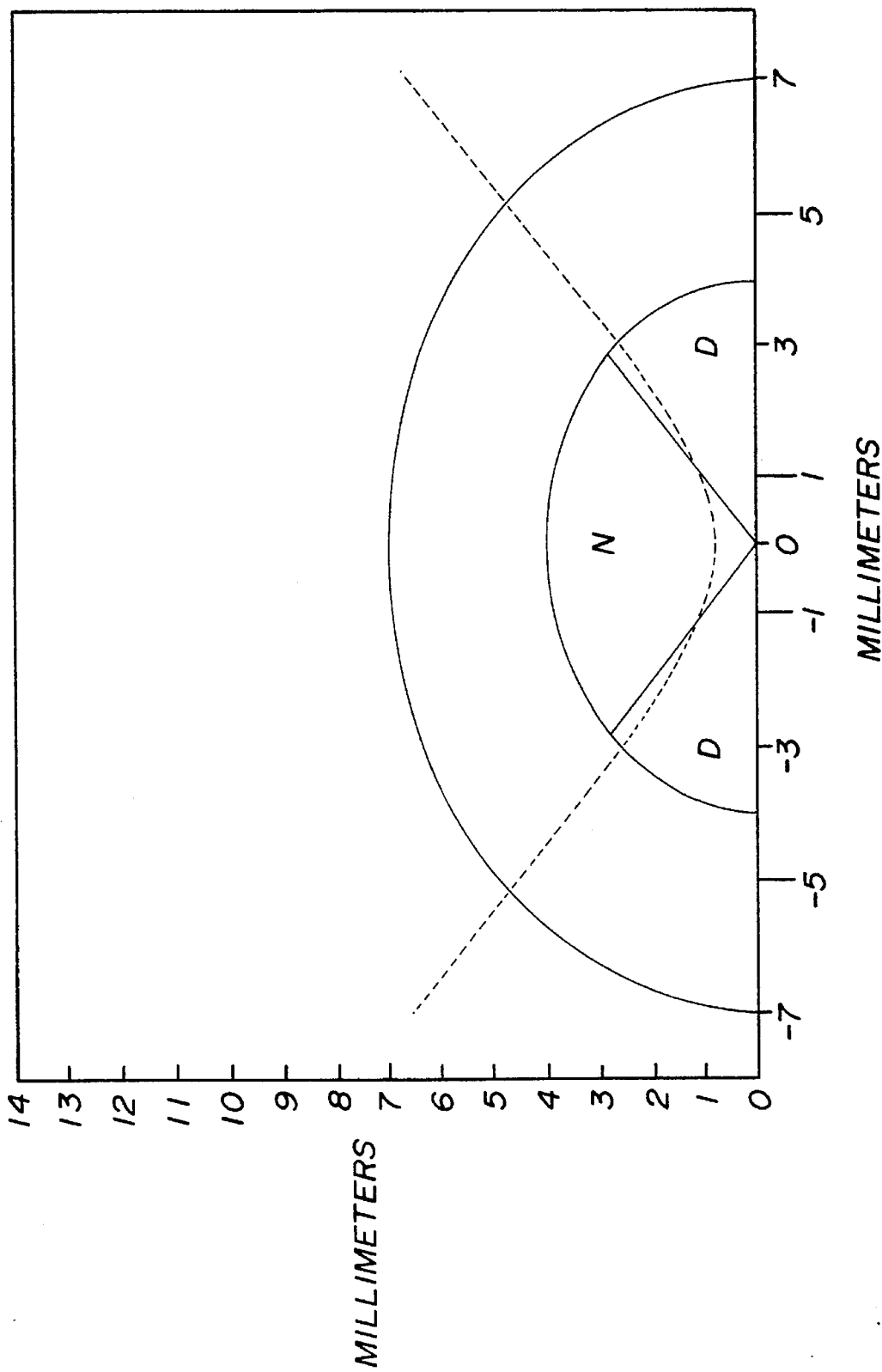

METHOD OF MAKING A CLEAR AXIS, SEGMENTED MULTIFOCAL OPHTHALMIC LENS

This is a division of application Ser. No. 07/827,199, filed Jan. 28, 1992, which is hereby incorporated by reference, now abandoned, which is a continuation-in-part of application Ser. No. 728,903 filed Jul. 10, 1991, now U.S. Pat. No. 5,198,844.

BACKGROUND OF THE INVENTION

In the past several decades contact lenses, and in particular soft hydrophilic contact lenses, have won wide acceptance among those requiring vision correction. The reason for this acceptance has been superior visual acuity, freedom from aberrant optical effects associated with spectacles (lack of peripheral vision, fogging, shifting of the lens) and improved personal appearance of the wearer.

It is well known that as an individual ages, the eye is less able to accommodate, i.e., bend the natural lens in the eye in order to focus on objects that are relatively near to the observer. This condition is referred to as presbyopia and presbyopes have in the past relied upon spectacles or other lenses having a number of different zones with different optical powers to which the wearer can shift his vision in order to find the appropriate optical power for the object or objects upon which the observer wishes to focus.

With spectacles this process involves shifting one's field of vision from typically an upper, far power to a different, near power. With ophthalmic lenses, such as intraocular or contact lenses, however, this approach has been less than satisfactory. The ophthalmic lens, working in conjunction with the natural lens, forms an image on the retina of the eye by focusing light incident on each part of the cornea from different field angles onto each part of the retina in order to form the image. For instance, as the pupil contracts in response to brighter light, the image on the retina does not shrink but rather light coming through a smaller portion of the lens is used to construct the entire image.

It is known in the art that under certain circumstances that the brain can discriminate separate competing images by accepting the in-focus image and rejecting the out of focus image.

One example of this type of lens used for the correction of the presbyopic by providing simultaneous near and far vision is described in U.S. Pat. No. 4,923,296 to Erickson. Described therein is a lens system which comprises a pair of contact lenses having one eye with a near upper portion and a distant lower portion while the other eye contains a distant upper portion and near lower portion. Together these are said to provide at least partial clear images in both eyes, and through suppression by the brain of the blurred images, allows alignment of the clear image to produce an in-focus image. This system however requires a ballasting by peripheral, prism, or weight to ensure the proper orientation of the lens on the eyes to achieve the above described affect.

Another attempt at providing a bifocal contact lens is described in European Patent Specification Publication No. 0107444; Application No. 83306172.4. Unlike the previous patent, the lens of this European Application does not require that the lens be oriented. The lens described in this application, however, is constructed by the use of different materials having different refractive indicia to achieve different optical powers or by having a different vision zones formed as a profile on the back surface of the lens. In addition, this lens could provide different ratios of near to far vision surface areas and may provide an insufficient amount of light for either the near or far field when the pupil passes through different diameters.

Prior art lenses using zones of a different refractive focal lengths were typically theoretical designs and not manufactured. This failure to realize an actual product is due to the inability to manufacture the type of lenses conceived. The production of contact lenses as well as intraocular lenses is performed by spin casting or precision lathe cutting. These processes produce radially symmetric lenses upon which it is extremely difficult to effect areas having different focal lengths because machining different curvatures around the lens is impossible.

One attempt known in the art to provide a method of compensating for presbyopia without complex lens manufacture is known as "monovision". In the monovision system a patient is fitted with one contact lens for distant vision in one eye and a second contact lens for near vision in the other eye. Although it has been found that with monovision a patient can acceptably distinguish both distance and near objects, there is a substantial loss of depth perception.

For these reasons although simple systems such as monovision are somewhat understood, more complex schemes for multifocal refractive lenses are primarily theoretical.

Another approach to producing a multifocal corrective eye lens involves the use of diffractive optics. One of the shortcomings of this approach, as with previously described types of multifocal lenses using radially symmetric, concentric near and far distance zones has been a deficiency in near vision, particularly at low light levels. In a diffractive design only about 40% of the light incident on the lens is used for near vision with another 40% being used for far vision. The remaining 20% is not used for either near or far vision, but rather is lost to higher orders of diffraction and scatter effect. This represents the best theoretical case and in manufacturing reality even less light is available due to manufacturing difficulties. Difficulty of manufacture in general represents another shortcoming of diffractive lenses since the diffractive surface must be to tolerances on the order of the wavelength of light.

It is an object of the present invention to provide a bifocal contact lens which is not sensitive to orientation and therefore does not require any type of ballasting or weighting but provides adequate depth perception.

It is further object of the invention to provide a lens that has a controlled ratio of areas for different focal lengths regardless of pupil diameter.

It is another object of the invention to provide a multifocal refractive lens for focusing light on the eye which contains at least one optical power having a surface curvature which is aspheric and provides a smooth boundary with its adjacent segments.

It is a further object of the invention to provide a method of producing multifocal lenses using lens surface molds to provide the multifocal optical powers. The lens surface molds are separated into interchangeable segments which can be assembled to provide a segmented multifocal lens which is then used to mold a lens using the lens mold surface.

SUMMARY OF THE INVENTION

The above objects are achieved by a non-oriented, multifocal refractive lens made of a plurality of segments having at least two different optical powers to effectively focus light on the retina of the eye and provide near and distant vision. A first optical power is provided on a first set of segments to provide distance vision while a second set of segments provides a second optical power to provide near vision. The optical powers may be provided by a variation in thickness or curvature of the refractive lens material. These segments can be arranged so that the ratio of the areas of each optical power remain constant despite the changing diameter of the pupil. The boundaries may either be line segments or curved arcuate paths.

Further, it has been found for multifocal refractive contact lenses that orientation of the lens is not required. With a plurality of segments of each power, each focal length effectively exists about the entire lens so that orientation of the lens is not critical.

Another aspect of the present invention is that at least one set of segments with a common optical power has an aspherical surface curvature. This aspherical lens surface allows the curvatures of the segments to be matched along their boundaries so as to be smooth and essentially continuous.

A further aspect of the invention is a method of producing a multifocal lens with a plurality of segments as described above. This type of lens may be made by taking lens surface molds for different optical powers and separating these lens surfaces into segments along a path from the center of the surface mold to the circumferential edge so that the segments are similarly sized and interchangeable. A multifocal lens mold can then be assembled from the segments of the first and second lens surface molds fitted together from that composite lens surface mold. A segmented multifocal lens can then be molded and subsequent to the molding the lens segments separated for later reuse.

Another aspect of the invention is the use of a particular arcuate path to divide the segments, such that the step height between segments is minimized.

BRIEF DESCRIPTION OF THE DRAWINGS

FIG. 11 shows on a scaled graph an alternate embodiment of the invention similar to that of FIG. 10 except the boundary between the near and distance optical zones is defined by a hyperbola rather than a semi-circle and is shown in comparison with the design having equal area segments with linear boundaries radially from the center of the lens.

DESCRIPTION OF THE PREFERRED EMBODIMENT

Figure 1:
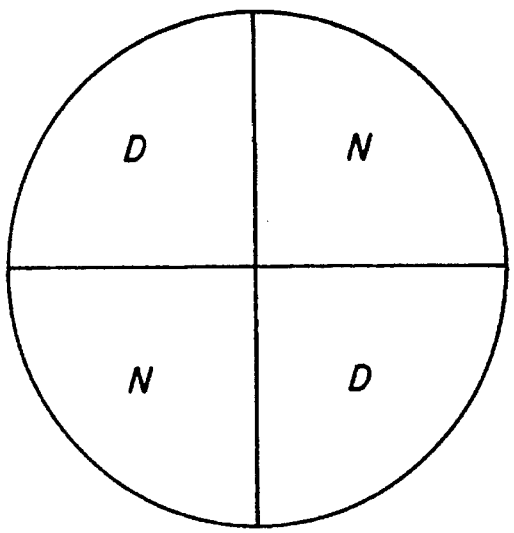
FIG. 1 is a plan view of an embodiment of the invention.

Referring to FIG. 1, the invention is shown in its simplest form, consisting of alternating near and distant portions. A fundamental advantage of this invention is that the lens shown has no weighting, ballasting or prism used to orient the lens in a particular orientation. Another aspect of this embodiment is that the area of near and distant focal lengths are equal and independent of pupil size. This pupil size independence can be realized by recognizing that the ratio of areas for near and distant vision remains the same for any circle within the lens concentric with the lens.

Figure 2:
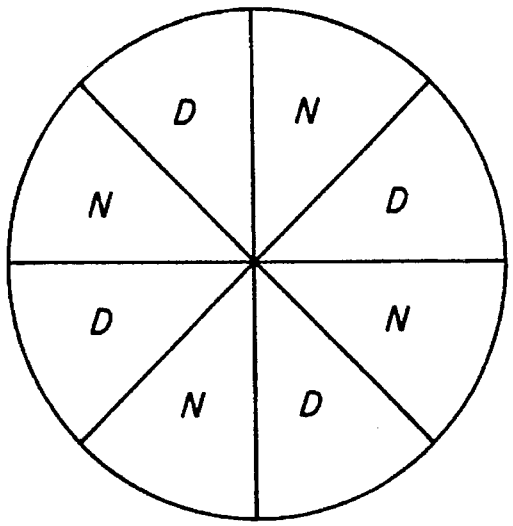
FIG. 2 is a plan view of another version of this embodiment.

Referring now to FIG. 2, a lens is shown similar to the lens FIG. 1 having equal areas of near and distant focal length. Again, there is no weighting, prisming or ballasting of the lens, but a larger number of segments which is potentially more difficult to manufacture, yields improved vision because of a more uniform distribution of near and far focal points over the entire lens.

One skilled in the art can appreciate that a fundamentally similar, but crude approximation of these segmented lens described herein is the method of compensating for presbyopia known as "monovision". In the monovision system the patient is fitted with one contact lens for distant vision in one eye and a second contact lens for near vision in the other eye. Although it has been found that with monovision a patient can acceptably distinguish both distance and near objects, there is a substantial loss of depth perception.

By having both distant and near focal length in both eyes, the wearer of the lens according to the present invention can not only have acceptable vision at both distant and near focal lengths, but also attains a fair degree of stereoscopic vision wherein depth perception is achieved.

As can be seen from FIGS. 1 and 2, unlike prior art lens designs that eliminated the need for ballasting by having a radially symmetric lens (a lens with a concentric distant and near lens portions), the present design does not require orientation because it consists of radial segments. These segments maintain equal areas of near and far focal lengths for an area within a circle concentric with the lens independent of the circles size, analogous to the pupil of the eye as it dilates and contracts with the amount of light incident upon eye.

In this way the lens of the present invention has the advantage that the ratio between the distant and near portion of the lens can either be set at each radius or can be a controlled function of the pupil size.

The advantage of using an aspheric surface of either near or distant portion, or on both, is that the aspheric shapes allow a design to be fabricated which has a uniform and equal lenticular junction and edge thickness. This is not possible with spherical sections. Although it is possible to design a lens according to the present invention with spherical sections that would meet optical requirements, the use of the aspheric surfaces on either one or both of the focal lengths areas minimizes step height difference between the surfaces and irritation to the eye.

Further, placing the optical surface on the front of the lens eliminates cornea insult, injury and debris entrapment.

As stated above, use of spherical surfaces is totally acceptable from the optical standpoint and can be utilized in certain embodiments, particularly with placement of the optical surface on the front of the lens against the eyelid rather than against the cornea.

The appropriate design of optical aspherical surfaces for artificial eye lenses is given in U.S. Pat. No. 5,050,981. In addition, other advantages of the use of the aspheric lens over typical spherical optical surfaces are described in this patent.

Figure 3:
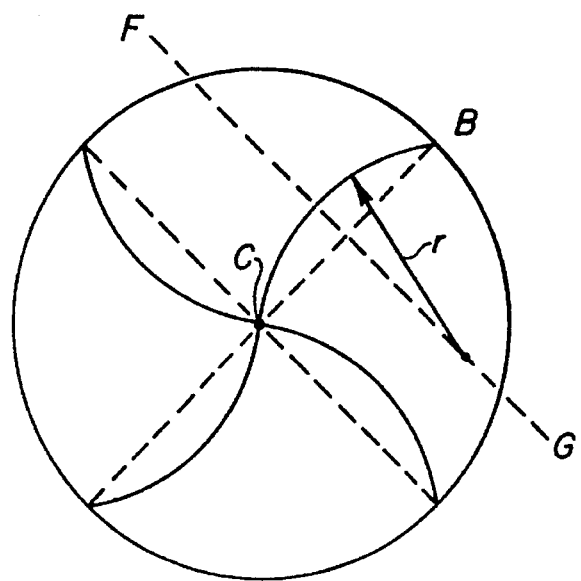
FIG. 3 is a plan view of another embodiment of the invention.

Other design techniques can be used to lessen the step height difference between near and distance segments for either the aspherical or spherical segment lens design. Referring to FIG. 3, a arcuate boundary between the near and distance segments of the lens can be used to decrease the height difference, particularly at intermediate points.

Using an arcuate boundary between the segments decreases the step height by defining a path that is at an angle to the gradient between the two segment heights. In practice, the arc is drawn with one end of the arc at the lens center and the other at the edge of the optic zone with the center of curvature placed along the perpendicular FG of the line connecting the two end points of the arc chord, CB. Arc chord, CB is a portion of a circle having a center point along line segment FG and radius r as shown in FIG. 3. A typical arc segment would be one where the radius is longer than the arc chord, for example, a ratio of two to one between the arc radius and the chord bisector. Ratios of two to one or greater would be expected to yield good results, although a ratio of less than two to one may be used, with the limiting case being a semicircle having its midpoint along line segment CB.

The arcs defining the boundaries would be placed upon the lens as shown in FIG. 3., having the symmetric pattern shown.

Figure 4:
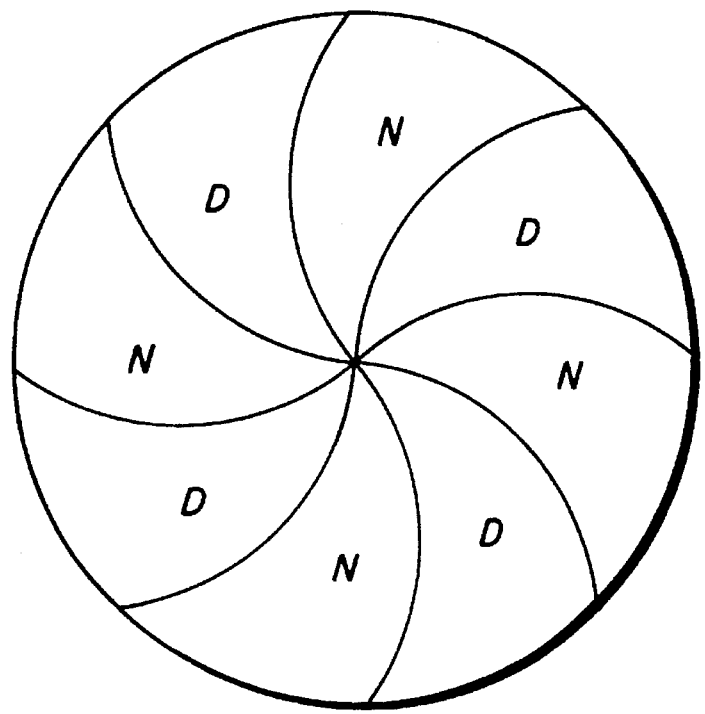
FIG. 4 is a plan view of another version of the embodiment of FIG. 3.

FIG. 4 shows another embodiment utilizing arcuate boundaries in this embodiment with the advantage of having additional near and distant segments.

Figure 5:
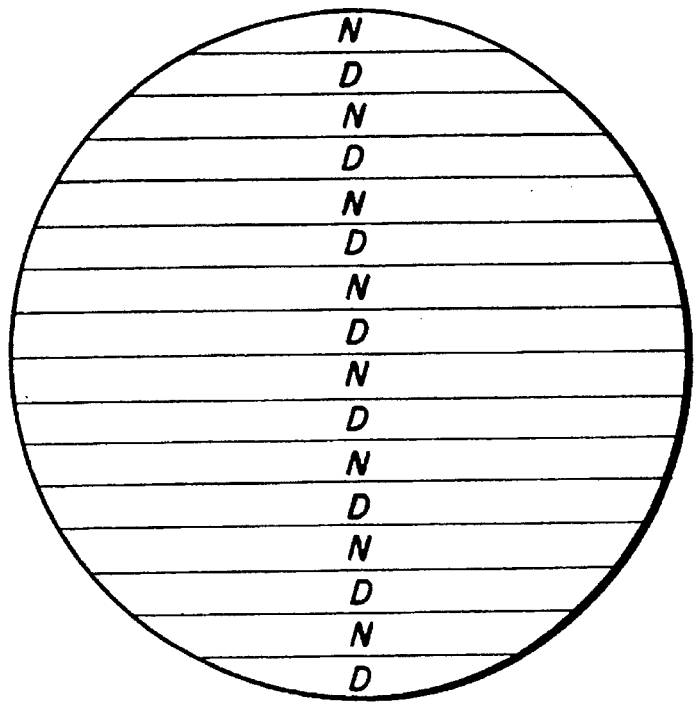
FIG. 5 is an alternate embodiment of the present invention.

Referring now to FIG. 5, an embodiment of the invention is shown maintaining a substantially constant ratio of distant and near lens areas independent of pupil size. Rather than using segments with boundaries from the center to the circumference, the lens is divided into line segment chords across the lens.

Figure 6:
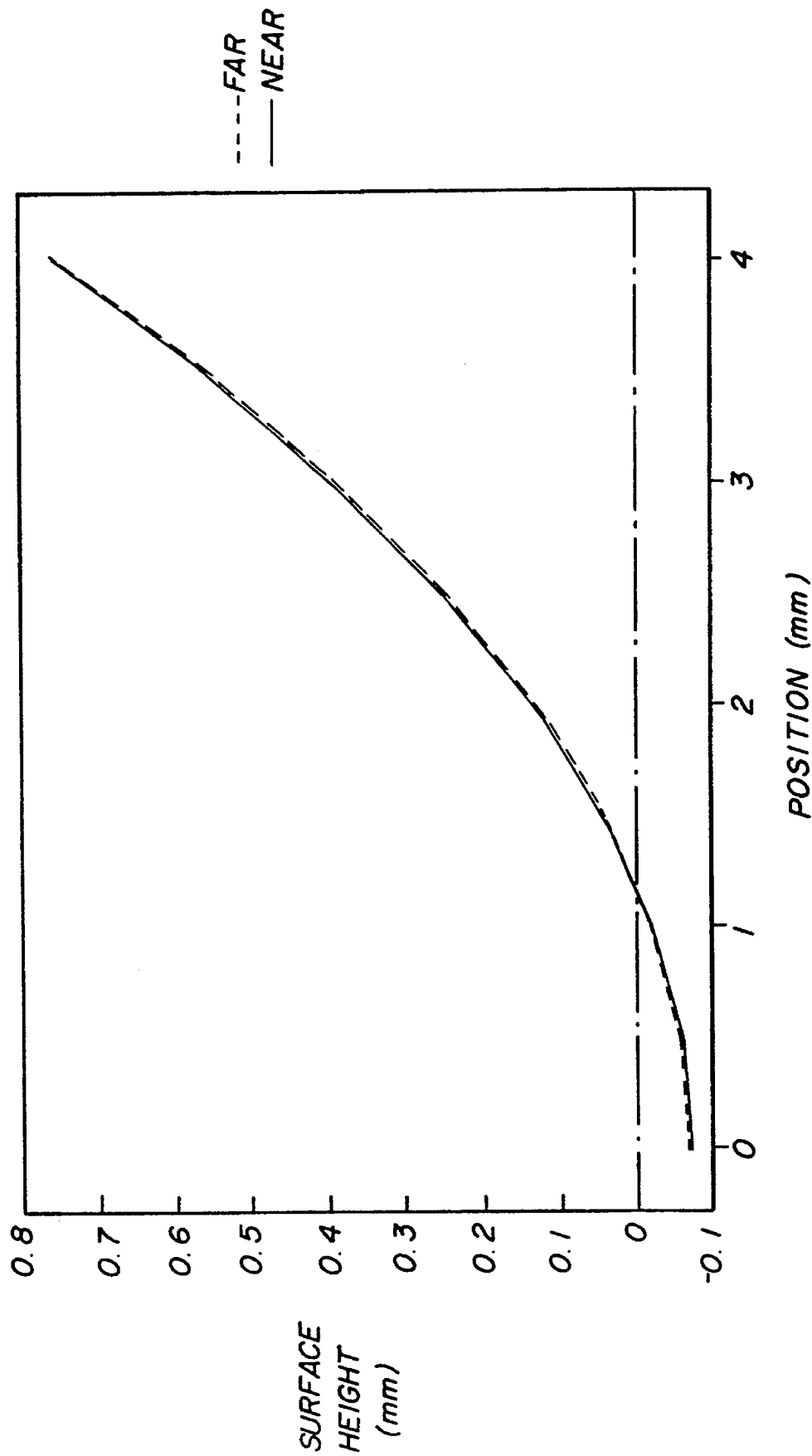
FIG. 6 is a graph showing a comparison between the lens surface height position of the optical power segments of a bifocal contact lens, one an aspheric and the other spherical for a contact lens made according to the present invention.

By way of specific example, reference is now made to FIG. 6 showing a comparison between the segment surface position for the distant focal portion of the lens and the near focal portion for a segmented aspheric bifocal lens made according to the embodiment shown in FIG. 1. In this example a lens is shown having a distant prescription of −5.25 diopters with a near vision portion add of +1.50 diopters, yielding a near portion vision having an absolute optical power of −3.75.

In numerical form it can be seen that the step height difference between the segments is less for the aspheric surface than for the spherical lens surfaces. Given are the height of the far focal surface, the near focal surface and the difference between these two at the boundary for both aspherical and the spherical lens design as a function of position from the center of the lens.

| Surface Height Comparison: aspheric distance & aspheric near contact lens | | | |
|---|---|---|---|
| Position (mm) | Far Surface | Near Surface | delta |
| 0.00 | −0.07000 | −0.07000 | 0.00000 |
| 0.10 | −0.06749 | −0.06740 | −0.00009 |
| 0.20 | −0.06498 | −0.06480 | −0.00018 |
| 0.30 | −0.06247 | −0.06220 | −0.00027 |
| 0.40 | −0.05996 | −0.05960 | −0.00036 |
| 0.50 | −0.05746 | −0.05700 | −0.00046 |
| 0.60 | −0.04991 | −0.04919 | −0.00072 |
| 0.70 | −0.04237 | −0.04139 | −0.00098 |
| 0.80 | −0.03483 | −0.03359 | −0.00124 |
| 0.90 | −0.02729 | −0.02579 | −0.00150 |
| 1.00 | −0.01974 | −0.01799 | −0.00175 |
| 1.10 | −0.00712 | −0.00499 | −0.00213 |
| 1.20 | 0.00550 | 0.00801 | −0.00251 |
| 1.30 | 0.01812 | 0.02101 | −0.00289 |
| 1.40 | 0.03074 | 0.03401 | −0.00327 |
| 1.50 | 0.04336 | 0.04701 | −0.00365 |
| 1.60 | 0.06114 | 0.06520 | −0.00406 |
| 1.70 | 0.07892 | 0.08338 | −0.00446 |
| 1.80 | 0.09670 | 0.10157 | −0.00487 |
| 1.90 | 0.11448 | 0.11976 | −0.00528 |
| 2.00 | 0.13226 | 0.13795 | −0.00569 |
| 2.10 | 0.15531 | 0.16132 | −0.00601 |
| 2.20 | 0.17836 | 0.18469 | −0.00633 |
| 2.30 | 0.20141 | 0.20807 | −0.00666 |
| 2.40 | 0.22446 | 0.23144 | −0.00698 |
| 2.50 | 0.24751 | 0.25481 | −0.00730 |
| 2.60 | 0.27598 | 0.28335 | −0.00737 |
| 2.70 | 0.30446 | 0.31189 | −0.00743 |
| 2.80 | 0.33293 | 0.34043 | −0.00750 |
| 2.90 | 0.36140 | 0.36897 | −0.00757 |
| 3.00 | 0.38988 | 0.39751 | −0.00763 |
| 3.10 | 0.42397 | 0.43121 | −0.00724 |
| 3.20 | 0.45806 | 0.46491 | −0.00685 |
| 3.30 | 0.49215 | 0.49861 | −0.00646 |
| 3.40 | 0.52624 | 0.53231 | −0.00607 |
| 3.50 | 0.56033 | 0.56601 | −0.00568 |
| 3.60 | 0.60029 | 0.60484 | −0.00455 |
| 3.70 | 0.64025 | 0.64368 | −0.00343 |
| 3.80 | 0.68021 | 0.68252 | −0.00231 |
| 3.90 | 0.72016 | 0.72136 | −0.00120 |
| 4.00 | 0.76012 | 0.76020 | −0.00008 |

| Surface Height Comparison spheric distance & spheric near contact lens | | | |
|---|---|---|---|
| Position (mm) | Far Surface | Near Surface | delta |
| 0.00 | −0.07000 | −0.07000 | 0.00000 |
| 0.10 | −0.06749 | −0.06740 | −0.00009 |
| 0.20 | −0.06498 | −0.06479 | −0.00019 |
| 0.30 | −0.06247 | −0.06219 | −0.00028 |
| 0.40 | −0.05996 | −0.05959 | −0.00037 |
| 0.50 | −0.05745 | −0.05699 | −0.00046 |
| 0.60 | −0.04991 | −0.04916 | −0.00075 |
| 0.70 | −0.04236 | −0.04133 | −0.00103 |
| 0.80 | −0.03481 | −0.03350 | −0.00131 |
| 0.90 | −0.02727 | −0.02567 | −0.00160 |
| 1.00 | −0.01972 | −0.01784 | −0.00188 |
| 1.10 | −0.00708 | −0.00472 | −0.00236 |
| 1.20 | 0.00557 | 0.00841 | −0.00284 |
| 1.30 | 0.01821 | 0.02153 | −0.00232 |
| 1.40 | 0.03085 | 0.03465 | −0.00380 |
| 1.50 | 0.04349 | 0.04777 | −0.00428 |
| 1.60 | 0.06133 | 0.06629 | −0.00496 |
| 1.70 | 0.07917 | 0.08482 | −0.00565 |
| 1.80 | 0.09700 | 0.10334 | −0.00634 |
| 1.90 | 0.11484 | 0.12187 | −0.00703 |
| 2.00 | 0.13268 | 0.14039 | −0.00771 |
| 2.10 | 0.15585 | 0.16448 | −0.00863 |
| 2.20 | 0.17903 | 0.18857 | −0.00954 |
| 2.30 | 0.20220 | 0.21265 | −0.01045 |
| 2.40 | 0.22538 | 0.23674 | −0.01136 |
| 2.50 | 0.24855 | 0.26083 | −0.01228 |

-continued

Surface Height Comparison
spheric distance & spheric near contact lens

| Position (mm) | Far Surface | Near Surface | delta |
| --- | --- | --- | --- |
| 2.60 | 0.27726 | 0.29070 | −0.01344 |
| 2.70 | 0.30597 | 0.32058 | −0.01461 |
| 2.80 | 0.33468 | 0.35045 | −0.01577 |
| 2.90 | 0.36339 | 0.38032 | −0.01693 |
| 3.00 | 0.39210 | 0.41019 | −0.01809 |
| 3.10 | 0.42660 | 0.44614 | −0.01954 |
| 3.20 | 0.46110 | 0.48208 | −0.02098 |
| 3.30 | 0.49559 | 0.51803 | −0.02244 |
| 3.40 | 0.53009 | 0.55398 | −0.02389 |
| 3.50 | 0.56459 | 0.58992 | −0.02533 |
| 3.60 | 0.60520 | 0.63232 | −0.02712 |
| 3.70 | 0.64582 | 0.67471 | −0.02889 |
| 3.80 | 0.68643 | 0.71711 | −0.03068 |
| 3.90 | 0.72705 | 0.75950 | −0.03245 |
| 4.00 | 0.76766 | 0.80190 | −0.03424 |

As can be appreciated by one skilled in the art making reference to my above referenced patent application describing the use of aspheric surfaces in eye lens design, the constant k associated with a particular lens surface curvature is an important selection process. In the above example, the k value used for establishing the aspherical curve for the near and distant vision surfaces in the aspheric lens design are different. The k value for the distant portion is −0.2 and the k value for the near portion is −1.06. These values are established for the present invention by design trial and error, but with the consideration the k value for the near portion should be approximately −1.00 and the k for the far portion set to keep the lenticular junction difference at or near zero.

Figure 7:
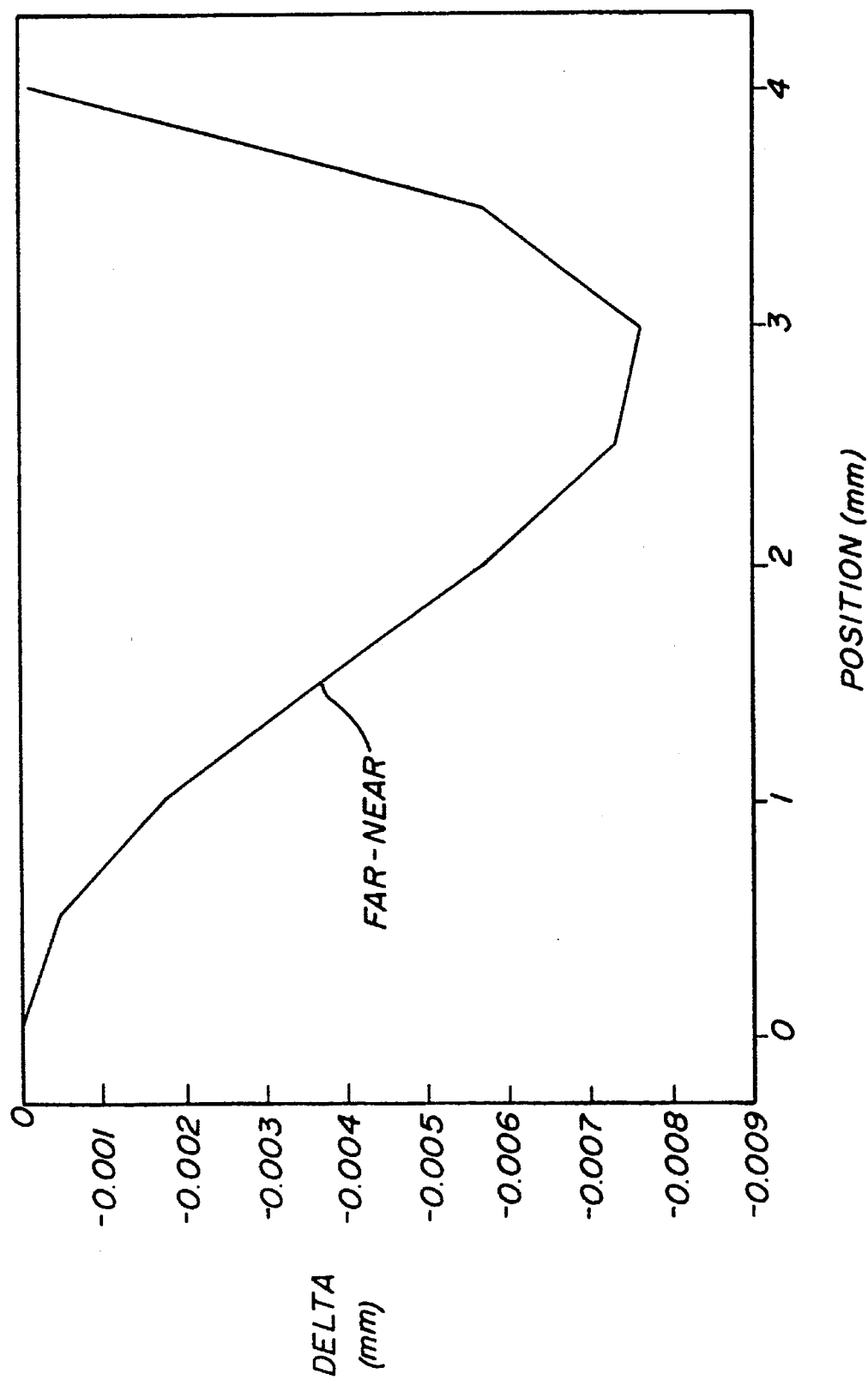
FIG. 7 is a graph showing the magnified difference between the two groups of FIG. 6.

Referring now to FIG. 7 there is shown in graphic form the step height difference between segments using aspherical lens surfaces. There is little improvement over the use of spherical lens surfaces near the center of the lens and the step height is small in any case.

However, halfway between the center and the edge, about 3 millimeters from the center of the lens, there is a step of about 0.008 millimeters, for an improvement of about 0.011 mm. At the edge the improvement is 0.034 mm.

In addition to providing less irritation to the cornea or eyelid, the decreased step differential and decreased center thickness allows increased local oxygenation of the cornea.

The arcuate boundary between segments of a multifocal lens reduce the step height between segments by traversing a path at a substantial angle to the gradient formed by the two different heights of lens material rather than having a boundary that substantially follows the gradient between the two heights of the lens segments.

Molding technology which allows precision molding of corrective eye lenses with high quality and repeatable optical surfaces now makes possible lenses with complex curvatures and surfaces. As can be appreciated by one skilled in the art, once the mold is made virtually any type of lens shape regardless of its complexity can be made repeatedly and with very little increase cost over simpler shapes.

A lens of the above type is preferably manufactured by molding. In general, the molding process preferred is that described in U.S. Pat. Nos. 4,495,313 and 4,889,664, which describe the molding of contact lenses using a diluent. In this process, the lens surface mold to be made is not made on the surface that will immediately mold the lens but is made one step removed on a metal surface which is used to make a plastic styrene mold which is then used to make the lens. As used in this specification, the word "mold" is used to refer to any previous generation of mold used in making the lens, that is not only the surfaces used to make lens itself, but the surfaces used to make the molds that ultimately make the lens.

The metal molds containing the multifocal segmented surfaces are made by selecting the appropriate lens powers from conventional spherical or aspherical molds. In the above example, these would be the surfaces corresponding to the −5.25 diopters and the surface corresponding to a −3.75 diopters.

These mold surfaces would then be cut into segments which are similar and interchangeable. Preferably, making segment cuts which correspond to diameters of the lens surface through the center point of the lens. These metal molds are precision cut with wire electrodynamic machining devices to produce segments with very little material loss and extremely close fit by optical polishing of the cut walls.

Molds produced in this way can be fitted together to produce a segmented multifocal lens and bonded to produce a surface that can be used to make a mold that ultimately makes the contact lens. These segments may be bonded together in making the contact lens mold and then separated for later reuse.

Figure 8:
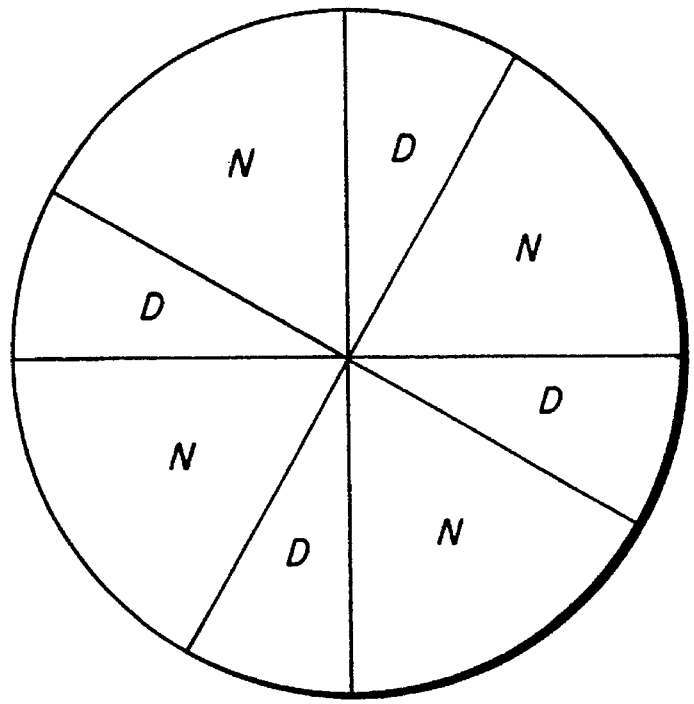
FIG. 8 is a plan view of an alternate embodiment of the invention where the ratio of the surface area between the near and distant vision is unequal and of a consistent ratio concentricly from the center to the circumference of the lens.

Referring to FIG. 8, although it is an advantage of this invention that equal surface areas for both the near and distant focal lengths can be maintained independent of pupil diameter, it is possible to make a lens according to the present invention having a predetermined ratio of near and distant focal length areas as shown. This is sometimes advantageous because near vision is particularly difficult in low light conditions. With the lens shown in FIG. 8, it is possible to have a predetermined ratio of distant to near focal length independent of pupil diameter.

Figure 9:
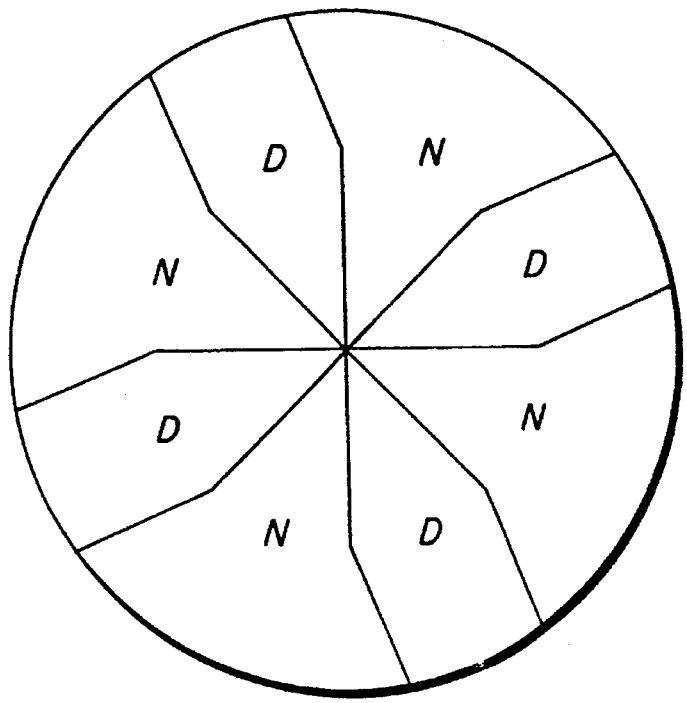
FIG. 9 is a plan view of an alternate embodiment of a lens having substantially equal areas of near and distant focal lengths near the center of the lens and an unequal ratio of areas of near and distant focal length toward the periphery of the lens.

Referring to FIG. 9, another embodiment of the invention is shown where the ratio between the area of near and distant focal length can be made to be a function of pupil diameter. In this instance, where the pupil diameter is small, there is an equal area of near and distant focal lengths. As the pupil diameter increases, however, such as under low light conditions, the ratio of near to distant focal length increase as can be readily seen and appreciated by one skilled in the art. It is easy to tailor not only the ratio of areas between near and distant focal length but also the point at which a transition is made and any of these configurations are easily manufactured by molding after the first lens mold is constructed as described above.

Figure 10:
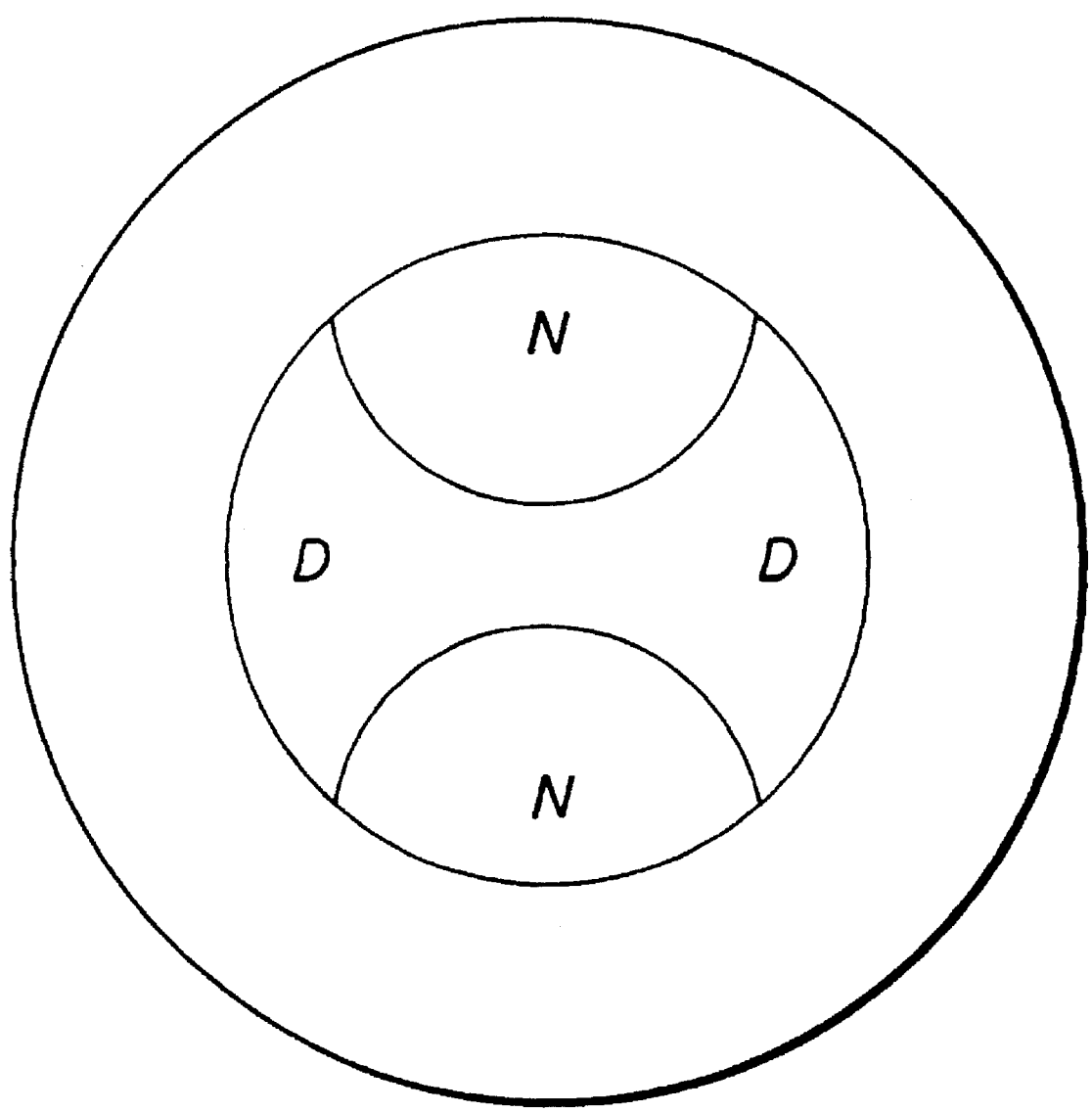
FIG. 10 is a plan view of an alternate embodiment of a lens having the optical portion limited to the central area of the lens and the near and far segments arranged such that one segment occupies the entire central optical zone.

Referring now to FIG. 10, an embodiment is shown wherein the optical portion of the lens is limited to a central region. This embodiment of the lens is further characterized by having the boundaries between the near segments and distant segment defined by semi-circular path that has both ends of the path on the adjoining perimeter of the near and distant segments. In addition, the boundaries defined by the path are outside the central zone contained within the optical region of the lens.

This embodiment has the advantage of eliminating from the central optical axis segment boundaries, including the central junction point found in the previously described embodiments.

As a specific example, a contact lens is provided where the near and distant optical portions have spherical optical radii of 8.696 millimeters and 9.027 millimeters, respectively. The distant optical segment preferably is chosen to be the one that includes the central zone of the optical region. The semi-circular boundary between the near and distant segments has a diameter of 5.165 millimeters and a center on the central region optic zone periphery. The lens has the typical diameter of 14 millimeters, and a minimum distance through the center axis between segment boundaries of 1.5 millimeters.

Referring now to FIG. 11, a plan view of one-half of a lens having a boundary which is hyperbolic arc is shown on a graphic scale. Shown along with this design are where the radial linear boundaries between near and distant optical portions would be for the prior 4-segment, equal area embodiment.

The use of the hyperbolic arc allows the lens to maintain a boundary-free central zone in the lens and can be designed to retain equal areas of near and distant optical portions.

In a lens with these particular dimensions, the equation describing the hyperbolic arc of this embodiment is given by the equation:

$$y = \frac{x^2}{r_s + \sqrt{r_s^2 - (k+1)x^2}}$$

where:

$r_s = 0.4535$ and $k = -1.25$

The offset or minimum distance from the central axis of the lens to the near/distant boundary is 0.6803 millimeters. In this embodiment, however, as can be seen from the figure, the hyperbolic arc is such that the slight loss of near focus optical area in the central zone of the lens is offset by the increase in near zone optical area at the periphery.

With either the embodiment shown in FIG. 10 or FIG. 11, it may be possible to construct the lens not only by cutting the entire contact lens mold, but also by machining the optical region of the mold. It is clear to one practicing in the art that if the optical surfaces are not machined as one piece that the lens may be made by the above described process wherein the molds having different optical powers can be precision cut along the appropriate curved path with wire electrodynamic machining devices and then polished. The cuts made into the outer peripheral, non-optical portion of the lens mold are of little consequence so long as they are properly matched to form a smooth surface.

In use the lens of the present invention gave results that were expected. A lens designed according to FIG. 1 was constructed for a presbyopic patient with the distant segment powers corresponding to his distance prescription and with an add power of +2.00 diopters. The actual lens construction was −5.50 diopters/minus −3.50 diopters of alternating spherical segments.

Clinical results with this patient yield both distant and near acuity of 20/20. Stereopsis was measured to a small as 40 arc seconds. This number represent a clinically normal level of stereopsis found in emmetropes as well corrected ametropes, including presbyopes wearing corrective spectacles.

The above description is given by way of example only and variation thereon can be practiced within the scope of the following claims.

We claim:

1. A method of producing a segmented multifocal lens for focusing light on the retina of an eye comprising:

making a first lens surface mold for a first lens optical power, said first lens surface mold having a central zone, making a second lens surface mold for a second lens optical power, said second lens surface mold having a central zone, separating each lens surface mold into at least two segments along a path from one point on the circumferential edge of each said surface mold to a second point on the circumferential edge of each said surface mold, said path being outside the central zone of each of such lens surface molds, such that segments from said first and second lens surface molds are fitted together to form a multifocal lens surface mold having at least one segment from each of said first lens surface mold and from said second lens surface mold, molding a segmented multifocal lens for focusing light on the retina of the eye using said multifocal lens surface mold, wherein the segments of the multifocal lens surface molds may be separated and reused with the same segments or from segments from a third lens surface mold.

2. The method of claim 1 wherein said multifocal lens surface mold is used to mold a contact lens with the optical surface on the front curve surface.

3. The method of claim 1 wherein said molding is performed using a diluent.

* * * * *